US 11,324,055 B2

(12) United States Patent
Van Lieshout et al.

(10) Patent No.: US 11,324,055 B2
(45) Date of Patent: *May 3, 2022

(54) PROCESSING STATE INFORMATION

(71) Applicant: Samsung Electronics Co., Ltd., Suwon-si (KR)

(72) Inventors: Gert-Jan Van Lieshout, Middlesex (GB); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

This patent is subject to a terminal disclaimer.

(21) Appl. No.: 16/907,980

(22) Filed: Jun. 22, 2020

(65) Prior Publication Data

US 2020/0322998 A1 Oct. 8, 2020

Related U.S. Application Data

(63) Continuation of application No. 16/199,924, filed on Nov. 26, 2018, now Pat. No. 10,694,556, which is a (Continued)

(30) Foreign Application Priority Data

Aug. 22, 2011 (GB) ..................... 1114476

(51) Int. Cl.
*H04W 36/08* (2009.01)
*H04W 36/00* (2009.01)
(Continued)

(52) U.S. Cl.
CPC .............. *H04W 76/10* (2018.02); *H04W 4/06* (2013.01); *H04W 8/22* (2013.01); *H04W 24/10* (2013.01);
(Continued)

(58) Field of Classification Search
None
See application file for complete search history.

(56) References Cited

U.S. PATENT DOCUMENTS

| 6,445,917 B1 | 9/2002 | Bark et al. |
| 8,345,632 B2 | 1/2013 | Mildh et al. |

(Continued)

FOREIGN PATENT DOCUMENTS

| CN | 101116277 A | 1/2008 |
| CN | 101453770 A | 6/2009 |

(Continued)

OTHER PUBLICATIONS

Samsung, "UE status reporting", 3GPP TSG-RAN2#77 bis meeting, R2-122638, May 14, 2012, Jeju, South Korea.

(Continued)

*Primary Examiner* — Ajit Patel
(74) *Attorney, Agent, or Firm* — Jefferson IP Law, LLP

(57) ABSTRACT

A method of operating a user equipment in a communications system including at least one cell that is controlled by a radio access node. The method includes maintaining current state information relating to the user equipment, the state information including at least one state information part associated with features for which state information reporting is configured in at least one cell, at least one state information part being associable with a plurality of different values, receiving an indication from the radio access node regarding state information held by the radio access node relating to the user equipment, determining whether to report current state information relating to the radio access node on the basis of the received indication, and reporting a current value associated with at least a given state information part to the radio access node.

12 Claims, 6 Drawing Sheets

Related U.S. Application Data continuation of application No. 15/421,867, filed on Feb. 1, 2017, now Pat. No. 10,143,021, which is a continuation of application No. 14/240,640, filed as application No. PCT/KR2012/006651 on Aug. 22, 2012, now abandoned.

(51) Int. Cl.

| | | |
|---|---|---|
| *H04W 76/10* | (2018.01) | |
| *H04W 8/22* | (2009.01) | |
| *H04W 24/10* | (2009.01) | |
| *H04W 4/06* | (2009.01) | |
| *H04W 72/04* | (2009.01) | |
| *H04L 12/18* | (2006.01) | |

(52) U.S. Cl.
CPC ..... *H04W 36/005* (2013.01); *H04W 36/0058* (2018.08); *H04W 36/0079* (2018.08); *H04W 72/04* (2013.01); *H04L 12/189* (2013.01)

(56) References Cited

U.S. PATENT DOCUMENTS

| | | | |
|---|---|---|---|
| 8,737,306 B2 | 5/2014 | Cui | |
| 8,818,368 B2 | 8/2014 | Yan et al. | |
| 8,874,117 B2 * | 10/2014 | Narasimha | H04W 36/08 455/438 |
| 9,374,838 B2 * | 6/2016 | Takano | H04W 36/0016 |
| 2005/0270981 A1 | 12/2005 | Shaheen et al. | |
| 2006/0251105 A1 | 11/2006 | Kim et al. | |
| 2007/0047493 A1 * | 3/2007 | Park | H04W 74/006 370/331 |
| 2007/0191013 A1 | 8/2007 | Gunnarsson et al. | |
| 2008/0107057 A1 | 5/2008 | Kannan et al. | |
| 2008/0214193 A1 | 9/2008 | Jeong et al. | |
| 2009/0010224 A1 | 1/2009 | Attar et al. | |
| 2009/0067339 A1 | 3/2009 | Byun et al. | |
| 2009/0086676 A1 | 4/2009 | Meylan et al. | |
| 2009/0143093 A1 | 6/2009 | Somasundaram et al. | |
| 2009/0191874 A1 * | 7/2009 | Du | H04W 36/18 455/436 |
| 2010/0003981 A1 | 1/2010 | Ahluwalia | |
| 2010/0113024 A1 | 5/2010 | Wu | |
| 2010/0124173 A1 | 5/2010 | Agashe et al. | |
| 2010/0124918 A1 | 5/2010 | Agashe et al. | |
| 2010/0173610 A1 | 7/2010 | Kitazoe et al. | |
| 2010/0178920 A1 * | 7/2010 | Kitazoe | H04W 36/0079 455/436 |
| 2010/0216471 A1 | 8/2010 | Meyer et al. | |
| 2010/0234014 A1 | 9/2010 | Virkki et al. | |
| 2010/0267378 A1 | 10/2010 | Hamabe et al. | |
| 2010/0298001 A1 | 11/2010 | Dimou et al. | |
| 2011/0019614 A1 | 1/2011 | O'Neill et al. | |
| 2011/0080825 A1 | 4/2011 | Dimou et al. | |
| 2011/0083048 A1 | 4/2011 | Yan et al. | |
| 2011/0103249 A1 | 5/2011 | Kim et al. | |
| 2011/0117908 A1 | 5/2011 | Huang et al. | |
| 2011/0124340 A1 | 5/2011 | Puttonen et al. | |
| 2011/0170516 A1 * | 7/2011 | Hu | H04W 36/0033 370/331 |
| 2011/0195714 A1 | 8/2011 | Sawinathan | |
| 2011/0263262 A1 | 10/2011 | Min et al. | |
| 2012/0008551 A1 | 1/2012 | Giaretta et al. | |
| 2012/0100852 A1 | 4/2012 | Horn | |
| 2012/0108252 A1 | 5/2012 | Dimou et al. | |
| 2012/0202482 A1 | 8/2012 | Katepalli et al. | |
| 2012/0202497 A1 | 8/2012 | Yan et al. | |
| 2012/0282968 A1 | 11/2012 | Toskala et al. | |
| 2013/0005344 A1 | 1/2013 | Dimou et al. | |
| 2013/0090118 A1 | 4/2013 | Jung et al. | |
| 2013/0178204 A1 | 7/2013 | Zhang et al. | |
| 2013/0237208 A1 | 9/2013 | Vujcic | |
| 2014/0248885 A1 | 9/2014 | Van Lieshout et al. | |
| 2014/0315537 A1 | 10/2014 | Van Lieshout et al. | |
| 2014/0362803 A1 | 12/2014 | Chun et al. | |
| 2015/0009801 A1 | 1/2015 | Velde et al. | |

FOREIGN PATENT DOCUMENTS

| | | |
|---|---|---|
| CN | 101637045 A | 1/2010 |
| CN | 101669381 A | 3/2010 |
| CN | 101895912 A | 11/2010 |
| CN | 101964994 A | 2/2011 |
| CN | 102025471 A | 4/2011 |
| CN | 102026394 A | 4/2011 |
| CN | 104396161 A | 3/2015 |
| EP | 1 689 134 A2 | 8/2006 |
| EP | 1 954 090 A1 | 8/2008 |
| EP | 2 182 758 A2 | 5/2010 |
| EP | 2 477 447 A1 | 7/2012 |
| EP | 2 606 676 A1 | 6/2013 |
| EP | 2 749 078 | 7/2014 |
| EP | 2749066 A2 | 7/2014 |
| GB | 2498781 A | 7/2013 |
| WO | 00/70897 A1 | 11/2000 |
| WO | 2005/096657 A1 | 10/2005 |
| WO | 2008/076073 A1 | 6/2008 |
| WO | 2008/099719 A1 | 8/2008 |
| WO | 2008/103745 A1 | 8/2008 |
| WO | 2008/151325 A1 | 12/2008 |
| WO | 2009/058069 A1 | 5/2009 |
| WO | 2010/104446 A1 | 9/2010 |
| WO | 2010/105416 A1 | 9/2010 |
| WO | 2010/151016 A2 | 12/2010 |
| WO | 2010/151198 A1 | 12/2010 |
| WO | 2010/151846 A1 | 12/2010 |
| WO | 2011/018616 A2 | 2/2011 |
| WO | 2011/041753 A1 | 4/2011 |
| WO | 2011/123006 A1 | 10/2011 |
| WO | 2011/136565 A2 | 11/2011 |
| WO | 2013/020517 A1 | 2/2013 |
| WO | 2013/027993 A2 | 2/2013 |
| WO | 2013/028002 A2 | 2/2013 |

OTHER PUBLICATIONS

Chinese Office Action dated Jul. 16, 2020, issued in Chinese Patent Application No. 201711295133.6.
CMCC et al., "Discussion on indication of coexistence interference", 3GPP Draft; R2-111251 Discussion on Indication of Coexistence Interference, 3rd Generation Partnership Project (3GPP), Mobile Competence Centre ; 650, Route Des Lucioles ; F-06921 Sophia-Antipolis Cedex ; France, vol. RAN WG2, No. Taipei, Taiwan; Feb. 21, 2011, Feb. 15, 2011 (Feb. 15, 2011), XP050493744, [retrieved on Feb. 15, 2011].
Extended European Search Report dated Nov. 26, 2020, issued in European Patent Application No. 20186988.0.

\* cited by examiner

PROCESSING STATE INFORMATION

CROSS-REFERENCE TO RELATED APPLICATION(S)

This application is a continuation application of prior application Ser. No. 16/199,924, filed on Nov. 26, 2018, which application is a continuation application of prior application Ser. No. 15/421,867, filed on Feb. 1, 2017, which has issued as U.S. Pat. No. 10,143,021 on Nov. 27, 2018, which is a continuation application of prior application Ser. No. 14/240,640, filed on May 1, 2014, which is a U.S. National Stage application under 35 U.S.C. § 371 of an International application filed on Aug. 22, 2012 and assigned application number PCT/KR2012/006651, which was based on and claimed priority of a United Kingdom patent application filed on Aug. 22, 2011 in the United Kingdom Intellectual Property Office and assigned Serial number 1114476.3, the disclosure of which is incorporated by reference herein in its entirety.

TECHNICAL FIELD

The present invention relates to processing state information.

BACKGROUND ART

Up to, and including, Release 10 (REL-10) of the Long Term Evolution (LTE) 3rd Generation Partnership Project (3GPP) specification number TS 36.300 "Evolved Universal Terrestrial Radio Access (E-UTRA) and Evolved Universal Terrestrial Radio Access Network (E-UTRAN); Overall Description; Stage 2", User Equipment (UE) reporting related to features such as Radio Link Failure (RLF) information availability, logged measurement information availability and proximity indication. It is expected that additional reporting will be introduced, for example regarding Multimedia Broadcast Multicast Services (MBMS) interest and in-device interference, in later releases.

The UE repeats reporting of such information following every cell change in connected mode, in other words following every handover or connection re-establishment. Some such information, such as RLF information and logged measurement information, is contained in mobility-related messages. Other information is (expected to be) transferred by means of a separate, dedicated message. It is expected that the UE will need to provide the E-UTRAN with more and more up-to-date information. It is expected that reporting on the part of the UE will increase, particularly following a change in cell.

DISCLOSURE OF INVENTION

Technical Problem

It would be desirable to provide improvements in processing information relating to user equipment.

Solution to Problem

According to a first aspect of the invention, there is provided a method of operating a user equipment in a communications system comprising at least one cell that is controlled by a radio access node, the method comprising:
maintaining current state information relating to the user equipment, the state information comprising at least one state information part associated with one or more features for which state information reporting may be configured in the at least one cell, the at least one state information part being associable with a plurality of different values;
receiving an indication from the radio access node regarding state information held by the radio access node relating to the user equipment;
determining whether to report current state information relating to the user equipment to the radio access node on the basis of the received indication; and
reporting a current value associated with at least a given state information part to the radio access node in response to determining that current state information relating to the user equipment should be transmitted on the basis of the received indication.

As such, unnecessary reporting of state information may be reduced. If the determination based on the received indication is that no reporting is required, or if no indication is received, the user equipment preferably refrains from transmitting a current value associated with a given state information part to the radio access node.

In some embodiments, the determining includes determining that the current value has not yet been received by the radio access node.

In some embodiments, the received indication comprises a version identifier indicating a version of the given state information part held by the radio access node.

Some embodiments comprise including the determining includes determining that the version identifier does not correspond with a current version of the given state information part.

Some embodiments comprise including a version identifier indicating the current version of the given state information part when reporting the value associated with the given state information part to the radio access node.

Some embodiments comprise advancing the version identifier indicating the current version of the given state information part upon reporting the value associated with the given state information part to the radio access node.

In some embodiments, the version identifier indicating a version of the given state information part held by the radio access node is a common version identifier that indicates a version of both the given state information part and at least one additional state information part.

Some embodiments comprise reporting the value associated with the given state information part and a value associated with the at least one additional state information part to the radio access node.

Some embodiments comprise including a common version identifier when reporting the value associated with the given state information part and the value associated with the at least one additional state information part to the radio access node.

In some embodiments, the indication is received from the radio access node on the basis of a change of connection of the user equipment from a first cell in the communications system to a second cell in the communications system.

According to a second aspect of the invention, there is provided user equipment for use in a communications system comprising at least one cell that is controlled by a radio access node, the user equipment comprising:
a data store for maintaining current state information relating to the user equipment, the state information comprising at least one state information part associated with one or more features for which state information reporting may be configured in the at least one cell, the at least one state information part being associable with a plurality of different values;

a radio interface for receiving an indication from the radio access node regarding state information held by the radio access node relating to the user equipment, and for reporting state information to the radio access node; and a processor configured to determine whether to report current state information relating to the user equipment to the radio access node on the basis of the received indication, and for reporting a current value associated with at least a given state information part to the radio access node in response to determining that current state information relating to the user equipment should be transmitted on the basis of the received indication.

According to a third aspect of the invention, there is provided a method of operating a user equipment in a radio access network comprising cells that are controlled by radio access nodes, the method comprising:

maintaining current state information relating to the user equipment, the state information comprising at least one state information part associated with one or more features for which state information reporting may be configured in a cell, the at least one state information part being associable with a plurality of different values;

initiating first reporting of a current value associated with at least a given state information part to a radio access node;

activating a timer on the basis of the initiation of the first reporting;

determining whether to initiate second reporting of the current value to a radio access node on the basis of one or more predetermined triggers; and initiating second reporting of the current value in response to detection of one of said of one or more predetermined triggers before expiry of a timing period measured by said timer.

As such, unnecessary reporting of state information may be reduced. If the timing period measured by said timer expires without detection of one of said of one or more predetermined triggers, the user equipment preferably refrains from transmitting a current value associated with a given state information part to the radio access node, and a radio access node may obtain the value by other means, such as by transfer of the information from another radio access node. The current value associated with a given state information part then does not need to be transmitted over the air interface if the user equipment refrains from such transmission. Since a significant amount of state information might otherwise require to be transmitted repeatedly over the air interface, this can result in significant improvements in efficiency of use of the bandwidth available over the radio interface. Nevertheless, if one of said of one or more predetermined triggers is detected before expiry of the timing period measured by said timer, the current value associated with a given state information part may then be transmitted, to ensure that the radio access node currently serving the user equipment has access to the state information required for improved operation of the user equipment.

In some embodiments, said one or more predetermined triggers comprise failure of a connection between the user equipment and the radio access network.

In some embodiments said one or more predetermined triggers comprises a message associated with handover between cells of the radio access network.

According to a fourth aspect of the invention, there is provided user equipment for use in a radio access network comprising cells that are controlled by radio access nodes, the user equipment comprising:

a data store for maintaining current state information relating to the user equipment, the state information comprising at least one state information part associated with one or more features for which state information reporting may be configured in a cell, the at least one state information part being associable with a plurality of different values; and a processor configured to:

initiate first reporting of a current value associated with at least a given state information part to a radio access node;

activate a timer on the basis of the initiation of the first reporting;

determine whether to initiate second reporting of the current value to a radio access node on the basis of one or more predetermined triggers; and initiate second reporting of the current value in response to detection of one of said of one or more predetermined triggers before expiry of a timing period measured by said timer.

Further features and advantages of the invention will become apparent from the following description of preferred embodiments of the invention, given by way of example only, which is made with reference to the accompanying drawings.

Advantageous Effects of Invention

According to the present invention, some improvements in processing information relating to user equipment is provided.

MODE FOR THE INVENTION

Figure 1:
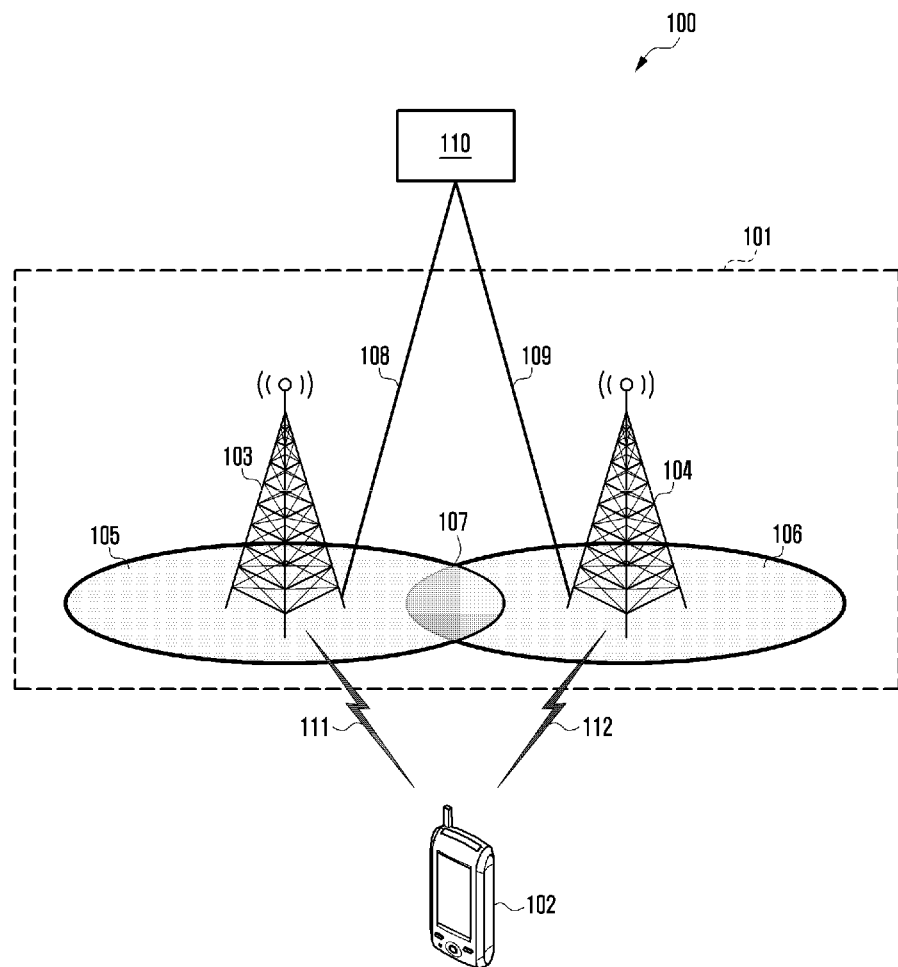
FIG. 1 is a block schematic representation of a communications system according to some embodiments.

FIG. 1 is a block schematic representation of a communications system 100 according to some embodiments.

The communications system 100 includes a radio access network, generally indicated in a dotted box in FIG. 1 and designated by reference 101. In some embodiments, the radio access network 101 comprises an E-UTRAN. At least some embodiments are intended to be applicable to release 11 (REL-11) and beyond of the E-UTRA. However, at least some embodiments may be applicable to other releases of the E-UTRA and/or other (radio access) systems.

The communications system 100 includes User Equipment (UE) 102. In some embodiments, the UE 102 is a mobile telephony device. However, other types of UE 102 are envisaged.

The radio access network 101 includes first and second radio access nodes 103, 104. The first and second radio access nodes 103, 104 control at least respective first and second cells 105, 106. It will be appreciated that one or both of the first and second radio access nodes 103, 104 may control more than one cell. The first and second radio access nodes 103, 104 may be communicatively coupled by means of one or more interfaces 107, 108, 109.

In some embodiments, the radio access nodes 103, 104 are evolved Node Bs (eNodeBs or eNBs). In such embodiments, the radio access nodes 103, 104 may be able to interact directly with each other via an X2 interface 107 and/or indirectly via respective Si interfaces 108, 109 to a Core Network (CN) 110. In some embodiments, the first radio access node 103 operates a first Radio Access Technology (RAT) and the second radio access node 104 operates a second, different RAT.

The UE 102 communicates with the first radio access node 103 via a first radio link 111 and communicates with the second radio access node 104 via a second radio link 112.

It will be appreciated that the communications system 100 may include more than one UE 102 and the radio access network 101 may include more than two radio access nodes and associated cells.

In some embodiments, one of the first and second radio access nodes, in this case the first radio access node 103, is a source radio access node 103 that is associated with a first cell 105. The source radio access node 103 may be configured to transmit state information relating to the UE 102. The other of the first and second radio access nodes, in this case the second radio access node 104, is a target radio access node 104 that is associated with a second cell 106. The target radio access node 104 is capable of receiving the state information from the source radio access node 103. The source radio access node 103 is configured to transmit the state information to the target radio access node 104 via the at least one interface 107, 108, 109 between the source radio access node 103 and the target radio access node 104.

The UE 102 is configured to maintain current state information relating to the UE 102. The state information comprises at least one state information part that is associated with one or more features for which state information reporting may be configured in the first cell 105 and/or the second cell 106. The at least one state information part is associable with a plurality of different values. The state information may be at least partly dynamic.

In some embodiments, the state information comprises status information relating to the UE 102, for example relating to proximity to a Closed Subscriber Group (CSG) cell, interest in MBMS services or in-device interference. In some embodiments, the state information comprises UE capability information, i.e. capability information relating to the UE 102, which is dynamic and may change, for example support for RLF information availability and/or logged measurement information availability, UE category information, or power class (which may change for example with the device is plugged into an external power source). One or more elements of the UE capability information may reflect the data rate that the UE currently supports. The current state of this information may depend on a task the UE 102 is performing e.g. playing a game, doing navigation, etc. In such cases the UE capabilities may change, dependent on the current operational state of the UE 102.

Other types of state information that the UE 102 may report to the radio access network 101 are contemplated.

In some cases, the connection may change from the first cell 105 to the second cell 106. The connection may change, for example, as a result of a handover or as a result of re-establishment following a connection failure. The UE 102 may detect such a connection change, for example by receiving a handover command or by detecting the connection failure. In embodiments in which the source radio access node 103 operates a first RAT and the target radio access node 104 operates a second, different RAT, this change in connection may be referred to as an inter-RAT cell change.

In some embodiments, the source radio access node 103 receives state information relating to the UE 102 and transmits the received state information to the target radio access node 104.

In some embodiments, the source radio access node 103 is configured to transmit at least part of the state information in a message associated with the change in connection. Thus, in some embodiments, as part of the change in connection (for example as part of handover preparation), the source radio access node 103 provides the state information to the target radio access node 104. In some embodiments, the message associated with the change in connection comprises a handover preparation message. In some embodiments, the source radio access node 103 is configured to include the at least part of the received state information in an Access Stratum (AS)-context field in a handover preparation message. Thus, in some embodiments, the at least part of the state information may be included in the AS-context field in a HandoverPreparationInformation message. In some embodiments, the source radio access node 103 is configured to include the at least part of the state information in an information container, the information container being a variable size string.

In some embodiments, the source radio access node 103 receives state information reports from the UE 102. The state information reports identify changes to the state information relating to the UE 102. In some embodiments, the UE 102 transmits state information reports only in the event of a change to at least part of the state information.

Some embodiments comprise receiving at least some of the state information from a radio access node (not shown in FIG. 1; see FIGS. 3 to 5) to which the UE 102 was previously connected.

In some cases, the state information received from the previous radio access node is not comprehensible by the source radio access node 103, for example because the source radio access node 103 and the previous radio access node may support different specification releases and/or functionality. By implementing backwards compatibility in protocols, the radio access nodes may still be able to cooperate for the functionality supported by both radio access nodes. Whenever the protocols evolve, extension fields may be introduced for newly added functionality. Backwards compatibility may be provided by configuring radio access nodes that do not support such newly added functionality and/or do not comprehend the associated extension fields or parameters to ignore the extensions or parameters, as the case may be. Nodes that support transparent transfer or forwarding may be able to identify the end of the state information, for example based on the size of the container in which the state information is included, without having to comprehend the details of the statue information (which is otherwise needed when using packed encoding rules (PER)).

In some cases, it may not seem beneficial or even desirable, to introduce 'transparent forwarding' of state information from a previous radio access node to the source radio access node 103 when the state information is not comprehensible by the source radio access node 103 since such transparent forwarding would allow forwarding of state information to nodes that do not comprehend the state information. While connected to such nodes, the UE 102 cannot provide state information reports and, hence, the forwarded state information might be outdated when it reaches the next radio access node. In such cases, the transfer of state information transparently may only serve to increase overall signaling in the radio access network 101, which is generally undesirable.

However, in some cases, transparent forwarding may be desirable. For example, it may typically be more difficult to upgrade femto radio access nodes than it is to upgrade macro radio access nodes. Consequently, it is quite possible that a femto radio access node would conform to an earlier (older) specification release than a macro radio access node. If the UE 102 operates on a frequency in which femto radio access nodes are deployed, the UE 102 may regularly connect to a radio access node that uses an old release that may not support state information reporting. Since femto cells are relatively small, the stay by the UE 102 in such cells may be rather short. Thus, it is quite possible that after passing through a femto cell, the UE 102 status is still valid. In such cases, it may be desirable to provide support for transparent forwarding of the state information by nodes that support transparent transfer but that may not support state information reporting in relation to features for which state information reporting is added in later releases.

As explained above, is generally desirable that unnecessary state information reporting by the UE 102 be minimized. As such, the UE 102 is configured to transmit a current value associated with a given state information part to the target radio access node 104 in response to detecting at least one of one or more predetermined triggers that indicate that the target radio access node 104 may not have received the current value from the source radio access node 103. The UE 102 relies on the target radio access node 104 having received the current value from the source radio access node 103 if said at least one of said one or more predetermined triggers is not detected. Thus, in some embodiments, the at least one predetermined trigger acts as an indicator that the target radio access node 104 may not have received, is unlikely to have received, or has not received, the current value from the source radio access node 103. In such cases, the UE 102 can report the current value to the target radio access node 104 so that the target radio access node 104 has up-to-date state information relating to the UE.

In some embodiments, the one or more predetermined triggers include determining that the target radio access node 104 has not received the current value from the source radio access node 103. In such embodiments, the UE 102 reports the current value to the target radio access node 104 so that the target radio access node 104 has up-to-date state information relating to the UE 102.

In some embodiments, the one or more predetermined triggers include determining that the current value has not been reported to the radio access network 101. In such embodiments, the UE 102 may determine that the target radio access node 104 has not received the current value, since the current value has not been reported. In response to detecting such a trigger, the UE 102 reports the current value to the target radio access node 104 so that the target radio access node 104 has up-to-date state information relating to the UE 102.

In some embodiments, the one or more predetermined triggers include determining that the current value may have been reported to the source radio access node 103 too late for the source radio access node 103 to have transmitted it to the target radio access node 104. It is possible that the value associated with the given state information part and/or other state information relating to the UE 102 changes after the source radio access node 103 has provided the latest state information it has relating to the UE 102 to the target radio access node 104. This situation is generally referred to herein as a "late change". In such a situation, the UE 102 may be configured to report the updated state information immediately following a cell change. Thus, in some embodiments, in the event that the state information has changed after the source radio access node 103 provided the state information relating to the target radio access node 104 (a late change), the UE 102 provides (again) the updated state information to the target radio access node 104, possibly immediately, following a handover or other change in connection.

However, the UE 102 may not know when exactly the source radio access node 103 provided the latest state information it had relating to the UE 102 to the target radio access node 104. Accordingly, various mechanisms are provided by means of which the UE 102 can detect whether a late change occurred. Two such mechanisms are discussed below: a timer-based scheme and a scheme in which version information is exchanged between the UE 102 and the radio access network 101. Other suitable mechanisms may, however, be used.

For UEs 102 in connected mode, the radio access network 101 typically initiates a cell change in response to a measurement report from the UE 102 indicating that the current serving cell is not optimal from a radio perspective. It is, however, also possible for the radio access network 101 to initiate a cell change for other reasons, for example the cell load. In such cases, handover may not be preceded by a measurement report. This is often referred to as a 'blind handover'. In such cases, the UE 102 cannot use the measurement report message as a rough indication of the time at which the source radio access node 103 is likely to have initiated handover preparation and have provided the latest state information it had relating to the UE 102 to the target radio access node 104. As such, the UE 102 may employ a timer to detect the occurrence of a late change.

In some embodiments, the one or more predetermined triggers include determining that the current value was reported to the source radio access node 103 within at least one predetermined time period prior to receiving a message relating to the change in connection. In some embodiments, the one or more predetermined triggers include determining that the current value was reported to the source radio access node 103 within at least one predetermined time period prior to detecting a failure in a connection to the source radio access node. Thus, in some embodiments, in the event that the state information has changed within a certain time period before the UE 102 receives the handover command or detects a failure with respect to the source radio access node 103, the UE 102 provides the updated state information to the target radio access node 104, possibly immediately, following handover or re-establishment as the case may be.

In some embodiments, the at least one predetermined time period includes a time period specified in a telecommunications standard, for example in one or more releases of 3GPP specification number TS 36.300. In some embodiments, the at least one predetermined time period includes a time period configured by the radio access network 101. Thus, in some embodiments, the time period during which a change in state information would trigger the UE 102 to provide an update may either by fixed (for example a value specified in the standard) or may be configured by the radio access network 101.

In some embodiments, the at least one predetermined time period includes a time period associated with a handover message. In some embodiments, the at least one predetermined time period includes a time period associated with a connection re-establishment procedure. Thus, in some embodiments, for handover and re-establishment, different time periods, during which a change in state information would trigger the UE 102 to provide an update, may be used.

In some embodiments, the one or more predetermined triggers include receiving, from the target radio access node 104, a message comprising at least one predetermined indicator from which it can be determined whether or not the target radio access node 104 has received the current value from the source radio access node 103. In such embodiments, the UE 102 can use the at least one predetermined indicator to determine whether or not the target radio access node 104 has received the current value from the source radio access node 103.

Another mechanism for the detection of late changes of UE state information upon handover or other changes in connection is for the UE 102 to provide a version identifier when reporting the state information. Thus, in some embodiments, the at least one predetermined indicator comprises a version identifier indicating a version of at least the given state information part.

In some such embodiments, the one or more predetermined triggers include determining that the version identifier received from the target radio access node 104 does not correspond with a current version of the given state information part. Thus, in some embodiments, the UE 102 may use the version identifier received in the message from the target radio access node 104 to determine whether the target radio access node 104 has outdated state information relating to the UE 102. If the version identifier received in the message does not correspond to the current version of the state information, the UE 102 provides the updated state information following the change in connection.

Some embodiments comprise including a version identifier indicating a version of the given state information part when reporting the value associated with the given state information part to the radio access network 101. Some embodiments comprise including a version identifier indicating a version of the given state information part when reporting a change in the value associated with the given state information part to the radio access network 101. Some such embodiments comprise advancing the version identifier indicating the version of the given state information part upon transmitting the change in the value associated with the given state information part to the radio access network 101. Some such embodiments comprise advancing the version identifier indicating the version of the given state information part upon reporting the change in the value associated with the given state information part to the radio access network 101.

Thus, in some embodiments, whenever the UE 102 provides state information, it includes a version identifier. In some cases, the UE 102 steps the version identifier whenever it transfers state information that is different from state information that was previously transmitted to the radio access network 101. The UE 102 may consider the state information to have been transferred successfully if one or more appropriate acknowledgements is received at lower layers. In certain cases, the UE 102 steps the version identifier whenever it transmits state information that is different from state information that was previously transmitted, regardless of whether the transmitted state information was known to be received successfully by the radio access network 101, since an acknowledgement might not be received even though the radio access network 101 had successfully received the state information.

For state information parts whose associated values changes frequently, late changes are not unlikely. A separate version identifier may be applied to such state information parts. In other cases in which late changes are unlikely, it may be sufficient to use one, common version identifier to cover some or all state information parts collectively. Thus, in some embodiments, the version identifier is a common version identifier that indicates a version of both the given state information part and at least one additional state information part. Thus, in some embodiments, a single version identifier (referred to herein as a "common version identifier") may be used to cover a plurality of separate state information parts.

Some such embodiments comprise including the common version identifier when reporting the value associated with the given state information part and/or the at least one additional state information part to the radio access network 101. Some such embodiments comprise including the common version identifier when reporting a change in the value associated with the given state information part and/or the at least one additional state information part to the radio access network 101. Some such embodiments comprise advancing the common version identifier upon transmitting the change in the value associated with the given state information part and/or the at least one additional state information part to the radio access network 101. Thus, in some embodiments, when using a common version identifier, the UE 102 steps the version identifier whenever it transfers a state information part that has a value that is different from the value associated with the state information part that was previously transmitted.

In some such embodiments, the one or more predetermined triggers include: determining that the common version identifier received from the target radio access node 104 does not correspond with a current common version of the given state information part and the at least one additional state information part; and determining that the value currently associated with the given state information part is different from the value associated with a version of the given state information part as indicated by the received common version identifier. Thus, in some embodiments, in the event that the common version identifier received in the message from the target radio access node 104 does not correspond with the version of the state information that the UE 102 has, the UE 102 provides updated state information including at least the values of the state information parts that changed compared to those in relation to the version identifier received in the message from the target radio access node 104.

In some embodiments, the message received from the target radio access node 104 relates to handover. In other embodiments, the message received from the target radio access node 104 relates to a connection re-establishment procedure. In some embodiments, the message received from the target radio access node relates to neither a handover command nor a connection re-establishment procedure. For example, the message may be a dedicated message from the target radio access node or may relate to one or more procedures other than handover or re-establishment.

In some embodiments described above, a version identifier is used to determine whether the last (successful) state information report in which the value associated with the given status element was reported was potentially too late for the source radio access node 103 to have transmitted it to the target radio access node 104. However, the network need not provide an indication that it received a previous value associated with the given state information part from another radio access node, such as the source radio access node 103. This as this can be indicated implicitly, for example by the absence of the version identifier or by the inclusion of a specific version identifier value. For example upon change a from a cell in which the UE 102 is not configured to report on the given state information part to a cell in which the UE 102 is configured to report on the given state information part, the UE 102 may (again) provide the updated value associated with the given state information part in the event that the target radio access node 104 indicates in a message that it transmits to the UE 102 that it does not have the updated value associated with the given state information part by not providing any version identifier, by means of a special or predefined version identifier value or by means of a separate indication, for example by using a separate indication for each state information part in the event that a common version identifier is used.

Thus, in some embodiments, the given state information part is associable with a version identifier that indicates a version of the given state information part and the at least one predetermined indicator includes a predetermined version identifier. In some embodiments, the given state information part is associable with a version identifier that indicates a version of the given state information part and the at least one predetermined indicator includes the absence of a version identifier associated with the given state information part.

In some embodiments, the one or more predetermined triggers include determining that the source radio access node 103, and/or or one more radio access nodes to which the UE 102 was previously connected since the value currently associated with the given state information part was reported to the radio access network 101, does not support forwarding of state information relating to the UE 102.

The indication that the target radio access node 104 does not have current state information may be provided in at least two different ways. One way in which the target radio access node 104 may indicate that it does not have the current state information is by indicating that it does not have any value associated with a particular state information part, for example using dedicated signaling. Another way in which it may be indicated that the target radio access node 104 does not have the current state information is for the radio access network 101 to indicate whether each cell or associated radio access node supports transparent transfer of state information relating to the user, for example by using broadcast signaling. In the latter case, the UE 102 assumes that target radio access node 104 does not have a current value associated with the given state information part if the UE 102 was connected to one or more cells that did not support transparent transfer of state information since it last provided an updated value associated with the given state information part to the radio access network 101.

Thus, the target radio access node 104 may indicate whether or not it has a value associated with the given state information part. The radio access network 101 may, also or alternatively, indicate for each cell whether or not the cell supports transparent transfer of state information relating to the UE 102. This may either be provided by using broadcast signaling, such as system information, or by using dedicated signaling as explained above. In the event of using dedicated signaling, the UE 102 assumes that the target radio access node 104 does not have a value associated with the given state information part if the UE 102 was connected to one or more cells that did not support transparent transfer of status info since it last provided a state information report for the one or more features associated with the given state information part.

Some embodiments comprise transmitting the value currently associated with the given state information part to the target radio access node 104 in response to said detecting at least one predetermined trigger only if the given state information part is associated with one or more features for which state information reporting is configured in the second cell 106.

One consideration is what state information the UE 102 should include when repeating the state information reporting due to a late change. Different radio access nodes may configure state information reporting for different features, for example because the radio access nodes are provided by different vendors and do not support the same set of features. For example, in the first cell 105, the UE 102 may be configured to perform state information reporting for features A and B, while in the second cell 106 the UE 102 may be configured to perform state information reporting for features B and C. In embodiments described above, unnecessary repeating of state information reporting may be reduced for the features that are shared between the first cell 105 and the second cell 106, in this case feature B. Additionally, the UE 102 may provide a state information report for the features that are newly configured by the second cell 106; those that are not shared with first cell 105 ? in this case feature C. Furthermore, the UE 102 need not repeat state information reporting due to a late change in relation to a feature, such as feature A in the example above, that is not configured in the second cell 106. Thus, in some embodiments, the UE 102 may be configured to repeat updated state information following a handover or another change in connection only if the late change concerned one or more features that are configured in the second cell 106 (irrespective of whether or not they are also configured in the first cell 105).

In some embodiments, the one or more predetermined triggers include determining that the given state information part is associated with one or more features for which state information reporting is configured in the second cell 106 and for which state information reporting is not configured in the first cell 105. As such, whenever the UE 102 moves from a cell associated with a radio access node that does support state information reporting for a particular feature to a node supporting reporting of the particular feature, the UE 102 reports the current value associated with the given state information part. Thus, in some embodiments, following a change in connected mode from a first cell 105 in which the UE 102 is not configured to report (changes to) a particular state information part to a second cell 106 in which the UE 102 is configured to report (changes to) the particular state information part, the UE 102 initiates a state information report regardless of whether or not the value associated with the particular state information part has changed compared to what was included in a previously sent state information report identifying a previous value associated with the particular state information part.

In some embodiments, the given state information part is associated with one or more features for which state information reporting is configured in the second cell 106 and for which state information reporting is not configured in the first cell 105.

In other embodiments, the given state information part is associated with one or more features for which state information reporting is configured in both the first cell 105 and the second cell 106. Such embodiments reduce unnecessary state information reporting by the UE 102 following a cell change, for example handover or re-establishment, in connected mode between cells in which the UE 102 is configured to report changes or updated associated with the given state information in both cells.

State information reporting by the UE 102 may include several procedural aspects, at least some of which may be handled in a common manner, while other aspects may need to be handled separately in relation to some of the state information parts.

Some embodiments comprise transmitting an additional current value associated with a further given state information part to the target radio access node in response to detecting at least one of one or more predetermined triggers that indicate that the target radio access node may not have received the additional current value from the source radio access node and relying on the target radio access node having received the additional current value from the source radio access node if said at least one of said one or more predetermined triggers is not detected. In some embodiments, at least the current value and the additional current value are included in a single message to the target radio access node. Thus, in some cases, a common message or procedure is introduced for the common reporting of several different state information parts. Common procedural aspects are specified at the level of this common message. Nevertheless, it may still be desirable to have a procedural specification for the state information parts included in the common message. This may be achieved by treating the different state information parts as if they were separate messages, so that the common message would be considered as a list of individual messages.

Figure 2:
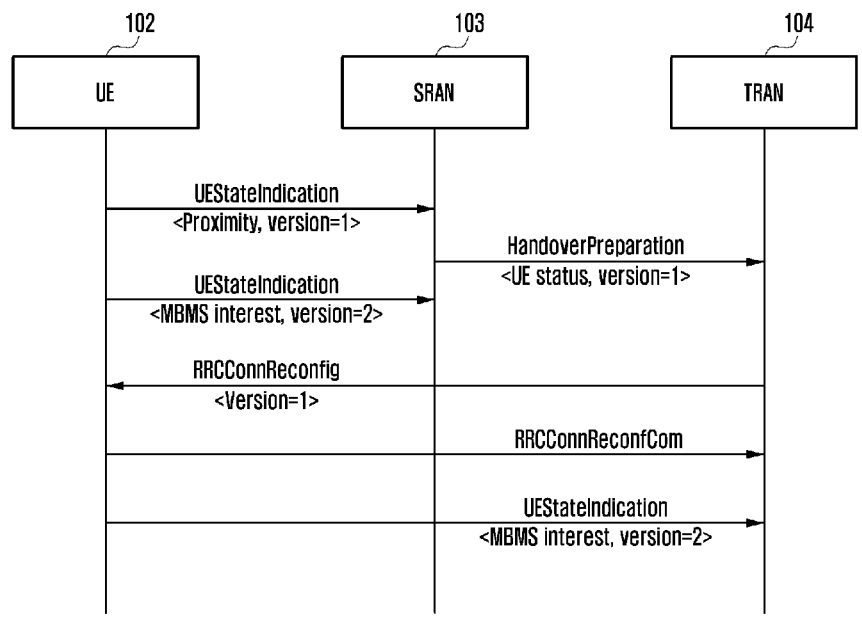
FIG. 2 shows a method of processing state information relating to user equipment according to some embodiments.

FIG. 2 shows a method of processing state information relating to user equipment according to some embodiments.

At least some embodiments described above may result in modifications to procedures and information specified in 3GPP TS 36.331, "Evolved Universal Terrestrial Radio Access (E-UTRA); Radio Resource Control (RRC); Protocol specification". Some modifications may include:

using a common message (UEStateIndication) to report at least the current value associated with the given state information part, for example following detection of late changes during handover;

extending the AS-Context field within the HandoverPreparation message to include at least the current value, possibly as well as a version identifier; and extending the RRCConnectionReconfiguration message, which is used to convey a handover command, to include the version identifier.

In some embodiments, the other config field, within an RRCConnectionReconfiguration message may be used to indicate timing information. In some embodiments, a UEStateInformation message may serve as a common state information message that includes an indication of (one or more) current version(s) of the state information. The UEStateInformation message my include both one of more state information values, for example indicating MBMS interest, as well as one or more version identifiers. In some embodiments, a new field may be provided within the RRCConnectionReconfiguration message to indicate the version(s) of state information that is available in the E-UTRAN upon handover. In some embodiments, the MeasurementReport message that the UE sends to the E-UTRAN may also be modified.

Figure 3:
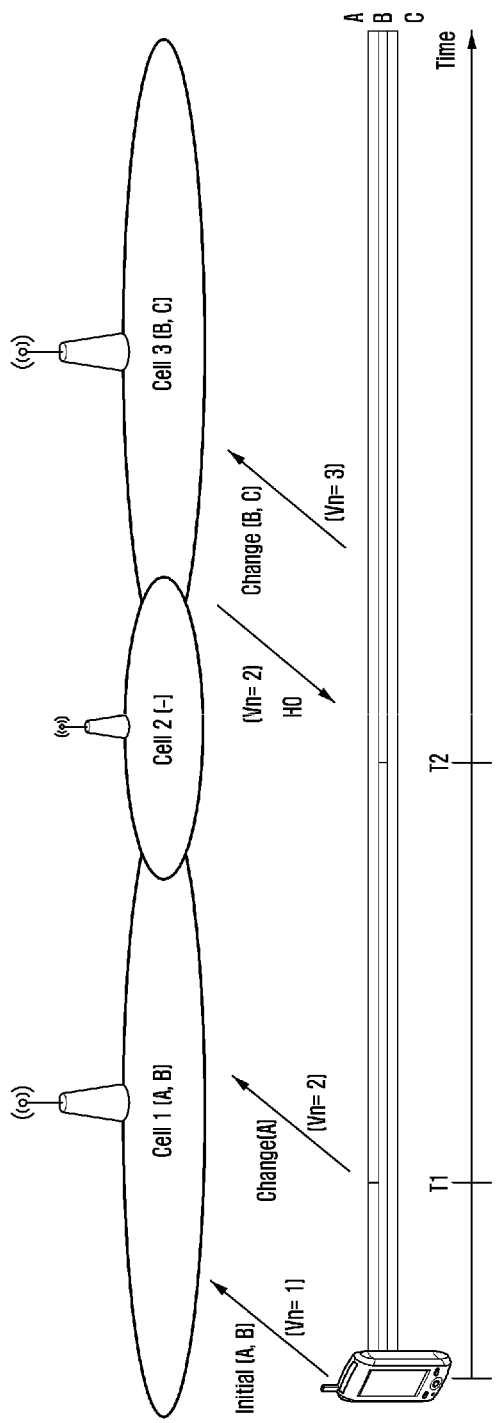
FIG. 3 shows a method of processing state information relating to user equipment according to some embodiments.

FIG. 3 shows a method of processing state information relating to user equipment in a communications system according to some embodiments. In these embodiments, a single, common version identifier is used to cover all of the state information parts making up the state information.

In this example, the state information relating to the user equipment comprises three different state information parts, denoted A, B and C and associated with features A, B and C respectively.

Three cells are depicted in which state information reporting is configured for different features. State information reporting for features A and B is configured in a first cell. State information reporting is not configured at all in a second cell. However, the second cell supports transparent forwarding of state information; in other words, although the second radio access node that controls the second cell does not comprehend state information that it receives from the first radio access node that controls the first cell, it forwards the state information to the third radio access node that controls the third cell. State information reporting for features B and C is configured in a third cell.

The UE 102 establishes an initial connection to the first radio access node, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2.

The UE 102 then moves, in connected mode, to the second cell. The first radio access node transmits the latest state information it has relating to the UE 102 to the second radio access node even though the second radio access node does not comprehend the state information.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves, in connected mode, from the second cell to the third cell. The second radio access node transmits the latest state information it has relating to the UE 102 ? which is the state information it received from the first radio access node ? to the third radio access node. In this case, the second radio access node transparently transfers the state information to the third radio access node.

The UE receives a message from the third radio access node which includes the version identifier Vn=2. This corresponds to the version of the state information that was transparently forwarded by the second radio access node.

The UE 102 determines that the third cell supports reporting of features B and C. The UE 102 does not transmit the current value associated with feature A (which was changed at time T1) to the third radio access node since reporting of feature A is not configured in the third cell. The UE 102 determines that it has not transmitted the updated value associated with feature B (which was changed at time T2) to the radio access network. The UE 102 also determines that it has not transmitted the (current) value associated with feature C to the radio access network, since reporting of feature C was not configured in either the first or second cell. As such the UE 102 transmits, in a common message, the current value associated with feature B (which was updated at time T2) and the current value associated with feature C at time T3 while the UE 102 is connected to the third cell and updates the version identifier associated with the state information to Vn=3.

Figure 4:
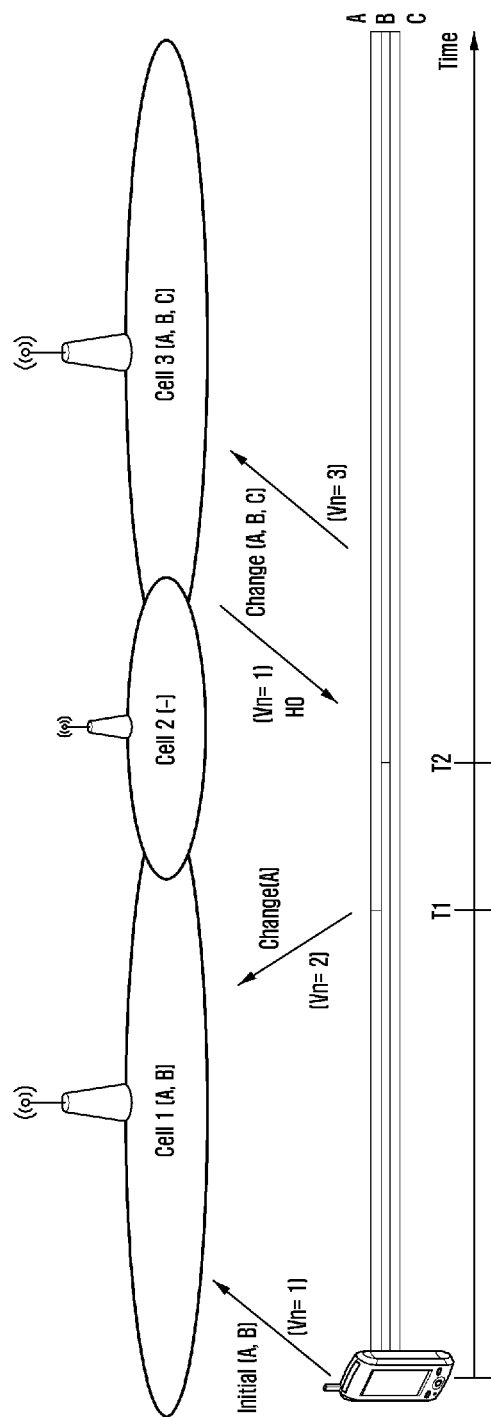
FIG. 4 shows a method of processing state information relating to user equipment according to some embodiments.

FIG. 4 shows a method of processing state information relating to UE 102 in a communications system according to some embodiments. In these embodiments, a single, common version identifier is used to cover all of the state information parts making up the state information.

The method shown in FIG. 4 is similar to that shown in FIG. 3. However, in this example, reporting of feature A, in addition to features B and C, is configured in the third cell.

In particular, the UE 102 establishes an initial connection to the first radio access node, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2. However, in this example, the UE 102 reports the changes value associated with feature A just prior to the UE 102 moving, in connected mode, to the second cell.

The first radio access node transmits the latest state information it has relating to the UE 102 to the second radio access node even though the second radio access node does not comprehend the state information. In this example, the first radio access node did not receive the updated state information from the UE 102 in time for it to be transmitted to the second radio access node. As such, the state information transmitted by the first radio access node to the second radio access node is the initially reported state information associated with the version identifier Vn=1.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves, in connected mode, from the second cell to the third cell. The second radio access node transmits the latest state information it has relating to the UE 102 ? which is the state information it received from the first radio access node ? to the third radio access node. In this case, the second radio access node transparently transfers the state information to the third radio access node. In this example, the transparently transferred state information include the version identifier Vn=1.

The UE 102 receives a message from the third radio access node which includes the version identifier Vn=1. This corresponds to the version of the state information that was transparently forwarded by the second radio access node.

The UE 102 determines that the third cell supports reporting of features A, B and C. The UE 102 determines that the third radio access node does not have the current value associated with feature A since the version identifier it received from the third radio access node (Vn=1) does not correspond with the current version of the state information (Vn=2). The UE 102 determines that the value associated with feature A changed between the first and second version and determines that the current value associated with feature A is to be transmitted to the third radio access node. The UE 102 determines that it has not transmitted the updated value associated with feature B (which was changed at time T2) to the radio access network. The UE 102 also determines that it has not transmitted the (current) value associated with feature C to the radio access network, since reporting of feature C was not configured in either the first or second cell. As such the UE 102 transmits, in a common message, the current value associated with feature A (which was updated at time T1), feature B (which was updated at time T2) and the current value associated with feature C at time T3 while the UE 102 is connected to the third cell and updates the version identifier associated with the state information to Vn=3.

Figure 5:
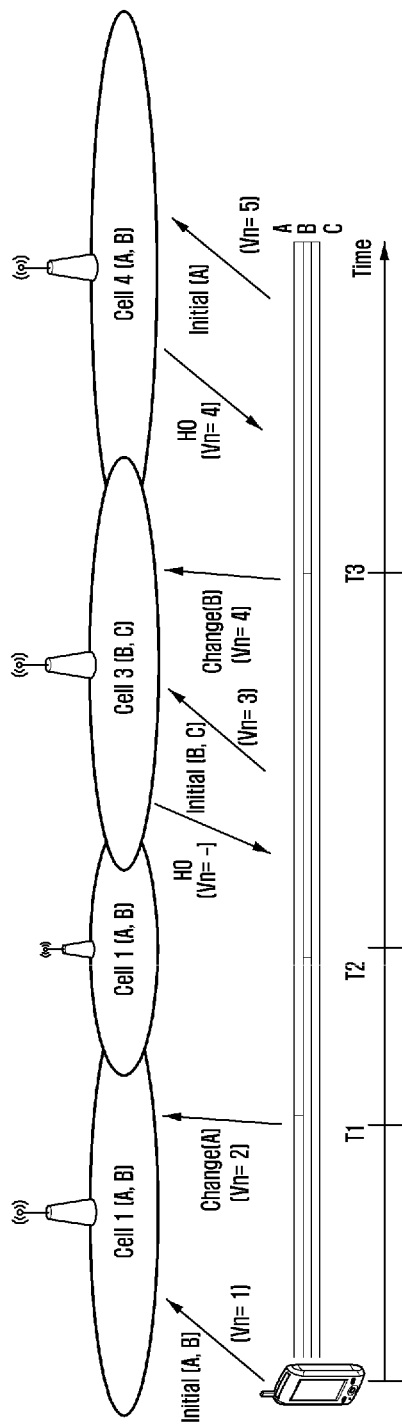
FIG. 5 shows a method of processing state information relating to user equipment according to some embodiments.

FIG. 5 shows a method of processing state information relating to user equipment in a communications system according to some embodiments. In these embodiments, a single, common version identifier is used to cover all of the state information parts making up the state information.

In this example, the state information relating to the user equipment comprises three different state information parts, denoted A, B and C and associated with features A, B and C respectively.

Four cells are depicted in which state information reporting is configured for different features. State information reporting for features A and B is configured in a first cell. State information reporting is not configured at all in a second cell. In this example, the second cell does not support transparent forwarding of state information. State information reporting for features B and C is configured in a third cell. State information reporting for features A and B is configured in a fourth cell.

The UE 102 establishes an initial connection to a first radio access node that controls the first cell, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2.

The UE 102 then moves to the second cell. However, since the second radio access node that controls the second cell does not support transparent forwarding of state information, the second radio access node does not receive state information from the first radio access node.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves the second cell to the third cell. Since the second radio access node does not support transparent forwarding of state information, the third radio access node does not receive the state information from the second radio access node.

The UE 102 receives a message from the third radio access node which includes a predetermined indicator from which the UE 102 can determine that the third radio access node does not have current state information. For example, the third radio access node may include no version identifier or a special parameter in a message to the UE 102.

The UE 102 determines that the third cell supports reporting of features B and C. The UE 102 does not transmit the current value associated with feature A (which was changed at time T1) to the third radio access node since reporting of feature A is not configured in the third cell. The UE 102 determines that it has not transmitted the updated value associated with feature B (which was changed at time T2) to the radio access network. The UE 102 also determines that it has not transmitted the (current) value associated with feature C to the radio access network. As such the UE 102 transmits, in a common message, the current value associated with feature B (which was updated at time T2) and the current value associated with feature C at time T3 while the UE 102 is connected to the third cell and updates the version identifier associated with the state information to Vn=3.

At time T3, while the UE 102 is in the third cell, the value of the state information part associated with feature B changes. Since the reporting of changes associated with feature B is configured in the third cell, the UE 102 reports the changed value to the third radio access node and step the version identifier associated with the state information to Vn=4.

The UE 102 then moves, in connected mode, from the third cell to the fourth cell. The third radio access node transmits the latest state information it has relating to the UE 102 to the fourth radio access node and includes the version identifier Vn=4.

The UE receives a message from the fourth radio access node which includes the version identifier Vn=4.

The UE 102 determines that the fourth cell supports reporting of features A and B. However, the UE 102 remembers determining that the second cell did not support transparent transfer of state information and that the fourth radio access node will not have the current value associated with feature A since reporting of feature A was not configured in the third cell. As such, the UE 102 determines that it will need to transmit the current value associated with feature A to the fourth radio access node. The UE 104 compares the version identifier it received from the fourth radio access node, Vn=4, to the current version identifier, Vn=4, and determines that the fourth radio access node has the current value associated with feature B. As such, the UE 104 determines that it need not transmit the current value associated with feature B to the fourth radio access node. Accordingly, the UE 102 transmits the current value associated with feature A to the fourth radio access node and updates the version identifier associated with the state information to Vn=5.

In some embodiments described above, the target radio access node 104 controlling the second cell 106 does not have up to date state information as a result of a change in connection from the source radio access node 103 to the target radio access node 104. However, at least some of the procedures described above, in particular relating to determining when the UE 102 should provide a new state information report, may also apply when the UE 102 moves from one cell to another cell, even if both cells are controlled by the same radio access node. In such cases, the UE may be configured to determine whether there is a need to provide a new state information report.

Figure 6:
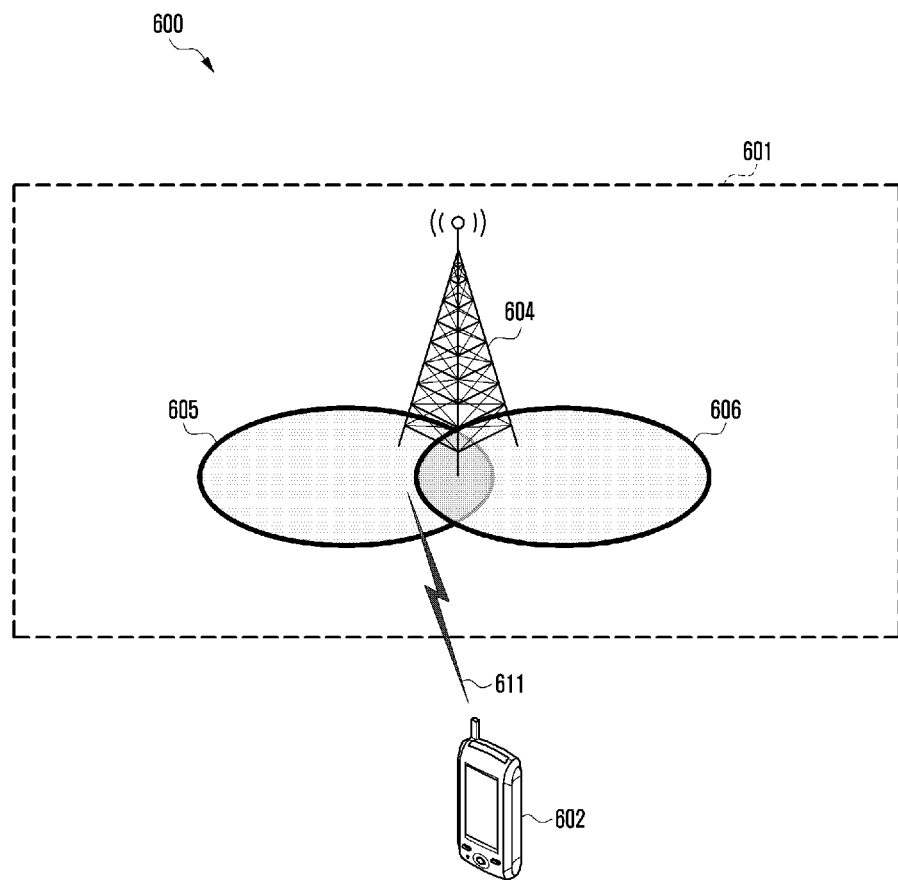
FIG. 6 is a block schematic representation of a communications system according to some embodiments.

FIG. 6 is a block schematic representation of a communications system 600 according to some embodiments. The communications system 600 depicted in FIG. 6 includes some elements that are the same as, or are similar to, elements shown in FIG. 1. Such elements are given the same reference numerals as used above in relation to FIG. 1 but are incremented by five hundred.

The communication system 600 depicted in FIG. 6 includes a radio access network 601, which includes a radio access node 604. The radio access node 604 controls first and second cells 605, 606. UE 602 can communicate with the radio access node 604 via a radio interface 611.

Some embodiments provide a method of processing state information relating to user equipment in a communications system 600 comprising a radio access network 601. The communications system 600 comprises a first cell 605 and a second cell 606. In some embodiments, the first cell 605 and the second cell 606 are controlled by the same radio access node 604. The method comprises maintaining current state information relating to the user equipment 602. The state information comprises at least one state information part associated with one or more features for which state information reporting may be configured in the first cell 605 and/or the second cell 606. The at least one state information part is associable with a plurality of different values. The UE 602 is configured to detect a connection change to the second cell. The UE is configured to transmit a current value associated with a given state information part to a radio access node 604 associated with the second cell 606 in response to detecting at least one of one or more predetermined triggers that indicate that the radio access node 604 associated with the second cell 606 may not have the current value. The UE 602 is configured to rely on the radio access node 604 associated with the second cell 606 having the current value if said at least one of said one or more predetermined triggers is not detected.

Some embodiments provide a method of processing state information relating to user equipment in a communications system 600 comprising a radio access network 601. The communications system 600 comprises at least one cell 605, 606 that is controlled by the radio access node 604. The method comprises maintaining current state information relating to the user equipment 602. The state information comprises at least one state information part associated with one or more features for which state information reporting may be configured in the at least one cell 605, 606. The at least one state information part is associable with a plurality of different values. The UE 602 is configured to detect a connection change in relation to the at least one cell 605, 606. The UE is configured to transmit a current value associated with a given state information part to a radio access node 604 associated with the at least one cell 605, 606 in response to detecting at least one of one or more predetermined triggers that indicate that the radio access node 604 associated with the at least one cell 605, 606 may not have the current value. The UE 602 is configured to rely on the radio access node 604 associated with the second cell 606 having the current value if said at least one of said one or more predetermined triggers is not detected. In such embodiments, the UE 602 may perform such processing even where there is no change of cell, for example in the case of re-establishing a connection to the radio access node 604 following detecting of a failure therewith.

At least some embodiments described above reduce the need for the UE 102, 602 to repeat state information reporting after every cell change in connected mode, for example as part of a handover or connection re-establishment procedure. In some embodiments, a source RAN node, such as a source eNb, forwards UE state information to a target RAN node, such as a target eNb. In some embodiments, following a cell change in connected mode from a cell in which the reporting of UE state information is not configured to a cell in which the reporting of UE state information is configured, the UE 102, 106 always provides updated state information. In some embodiments, following a cell change in connected mode between cells in which the reporting of UE state information is configured, the UE 102 provides updated state information if: at least part of the state information changed shortly before the cell change and/or if a 'version' received from the target radio access node 104 indicates that the target radio access node 104 does not have up-to-date UE state information. In some such embodiments, a version can be exchanged on the basis of individual state information parts or a common version can be used to cover a plurality of state information parts. In some embodiments, a common message or procedure may be used to specify the elements (information as well as procedural aspects) that are common for all state information parts only once. At least some embodiments provide mechanisms to limit repeated state information reporting by the UE 102, 602 after every cell change in connected mode. Some embodiments seek to minimize the repetition, by transferring state information from a source node to a target node, complemented with the UE 102, 062 providing one or more state information reports in the event that the state information may have changed after the source node transferred the state information to the target node.

The above embodiments are to be understood as illustrative examples of the invention. Further embodiments of the invention are envisaged.

In the above embodiments, the version identifier may be a version number. Other types of version identifier such as letters or other symbols or parameters are envisaged. Furthermore, although embodiments above refer to a 'value' associated with a state information part, it will be appreciated that the value need not be numeric and may depend upon possible states of one or more features with which the state information part may be configured.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method performed by a terminal in a wireless communication system, the method comprising:
    transmitting, to a first base station, a first control message for indicating terminal state information;
    receiving, from the first base station, a second control message including information associated with a handover of the terminal from the first base station to a second base station; and
    transmitting, to the second base station after completing a random access procedure triggered based on the second control message, a third control message including same terminal state information as the terminal state information of the first control message, in case that the first control message was transmitted to the first base station during a last predetermined time period.

2. The method of claim 1, wherein the transmitting of the first control message is initiated based on a determination that current terminal state information is different from terminal state information of a last transmission before the first control message.

3. The method of claim 1, wherein the terminal state information of the first control message includes information on an in-device coexistence of the terminal.

4. A method performed by a system including a first base station and a second base station, the method comprising:
    receiving, by the first base station from a terminal, a first control message for indicating terminal state information;
    transmitting, by the first base station to the terminal, a second control message including information associated with a handover of the terminal from the first base station to the second base station; and
    receiving, by the second base station from the terminal after a random access procedure triggered based on the second control message is completed, a third control message including same terminal state information as the terminal state information of the first control message, in case that the first control message was received by the first base station during a last predetermined time period.

5. The method of claim 4, wherein the terminal state information included in the first control message is different from terminal state information of a last reception before the first control message.

6. The method of claim 4, wherein the terminal state information of the first control message includes information on an in-device coexistence of the terminal.

7. A terminal in a wireless communication system, the terminal comprising:
    a transceiver configured to transmit or receive a signal; and
    a controller configured to:
        transmit, to a first base station, a first control message for indicating terminal state information,
        receive, from the first base station, a second control message including information associated with a handover of the terminal from the first base station to a second base station, and
        transmit, to the second base station after completing a random access procedure triggered based on the second control message, a third control message including same terminal state information as the terminal state information of the first control message, in case that the first control message was transmitted to the first base station during a last predetermined time period.

8. The terminal of claim 7, wherein the transmission of the first control message is initiated based on a determination that current terminal state information is different from terminal state information of a last transmission before the first control message.

9. The terminal of claim 7, wherein the terminal state information of the first control message includes information on an in-device coexistence of the terminal.

10. A system comprising:
    a first base station; and
    a second base station,
    wherein the first base station is configured to:
        receive, from a terminal, a first control message for indicating terminal state information, and
        transmit, to the terminal, a second control message including information associated with a handover of the terminal from the first base station to the second base station, and
    wherein the second base station is configured to:
        receive, from the terminal after a random access procedure triggered based on the second control message is completed, a third control message including same terminal state information as the terminal state information of the first control message, in case that the first control message was received by the first base station during a last predetermined time period.

11. The system of claim 10, wherein the terminal state information included in the first control message is different from terminal state information of a last reception before the first control message.

12. The system of claim 10, wherein the terminal state information of the first control message includes information on an in-device coexistence of the terminal.

\* \* \* \* \*